United States Patent
Antonucci et al.

(10) Patent No.: US 6,688,831 B2
(45) Date of Patent: Feb. 10, 2004

(54) FASTENING DEVICE WITH SHEARING CAPABILITY

(75) Inventors: Jeffrey L. Antonucci, West Chester, PA (US); Nicholas Roy Weiland, Fitzroy (AU)

(73) Assignee: Southco, Inc., Concordville, PA (US)

( * ) Notice: Subject to any disclaimer, the term of this patent is extended or adjusted under 35 U.S.C. 154(b) by 24 days.

(21) Appl. No.: 09/725,371

(22) Filed: Nov. 29, 2000

(65) Prior Publication Data

US 2001/0041113 A1 Nov. 15, 2001

(Under 37 CFR 1.47)

Related U.S. Application Data

(60) Provisional application No. 60/167,775, filed on Nov. 29, 1999.

(51) Int. Cl.[7] ................................. F16B 21/00
(52) U.S. Cl. ........................ 411/553; 411/550
(58) Field of Search .................... 411/349, 549, 411/550, 552, 553, 174; 292/58, 59, 62

(56) References Cited

U.S. PATENT DOCUMENTS

| | | | | |
|---|---|---|---|---|
| 2,325,295 A | * | 7/1943 | Zaleske | |
| 2,798,277 A | * | 7/1957 | Flora | |
| 3,123,880 A | * | 3/1964 | Barry | |
| 3,179,367 A | * | 4/1965 | Rapata | |
| 3,258,887 A | * | 7/1966 | Mostoller | |
| 4,677,714 A | * | 7/1987 | Wright | |
| 4,827,609 A | * | 5/1989 | Kawecki | |
| 5,199,834 A | * | 4/1993 | Seidl et al. | |
| 5,486,079 A | * | 1/1996 | Martin | |

FOREIGN PATENT DOCUMENTS

FR          0861090     *  1/1941

OTHER PUBLICATIONS

Southco Latches and Access Hardware Catalog, Handbook 45 NA, pp. B–3 through B–30 (1995).
Dzus Quarter–Turn Fasteners Web Pages, pp. 1–2 (Apr. 8, 1999).
Dzus Panel Line Quarter–Turn Fasteners Web Pages, pp. 1–4 (Apr. 8, 1999).
Dzus Standard Line Quarter–Turn Fasteners Web Pages, pp. 1–2 (Apr. 8, 1999).
Dzus Dart Quarter Turn Fasteners Web Pages, p. 1 (Apr. 8, 1999).
Dzus Arrow Quarter Turn Fasteners Web Pages, p. 1 (Apr. 8, 1999).
Dzus Pilot Quarter Turn Fasteners Web Pages, p. 1 (Apr. 8, 1999).
Dzus Panex Quarter Turn Fasteners Web Pages, pp. 1–2 (Apr. 8, 1999).
Dzus Rapier Quarter–Turn Fasteners Web Pages, pp. 1–2 (Apr. 8, 1999).

* cited by examiner

Primary Examiner—Flemming Saether
(74) Attorney, Agent, or Firm—Paul & Paul (57) ABSTRACT

A fastening device for securing a panel to a frame is adapted to shear at a predetermined load to free the panel. A stud and an "S"-shaped receptacle cooperate to provide a predetermined breakpoint.

19 Claims, 6 Drawing Sheets

FIG. 6

FASTENING DEVICE WITH SHEARING CAPABILITY

CROSS REFERENCE TO RELATED APPLICATIONS

This application claims the benefit of U.S. Provisional Application No. 60/167,775, filed Nov. 29, 1999.

BACKGROUND OF THE INVENTION

1. Field of the Invention

The present invention relates to the field of fastening devices, and particularly, to a fastening device which is utilized in the form of a stud and receptacle.

2. Description of the Related Art

Many types of fastening devices have been used for releasably securing one or more panels to a frame, or one panel to another. It is known to provide studs, such as, for example, quarter-turn fasteners which are received in a variety of associated receptacles. Some studs are provided to spread the receptacle to provide positive engagement against withdrawal of the stud and receptacle in order to retain a panel or other attaching member.

A need exists for a fastening member which can be readily installed to hold a panel onto a frame or other member, and which has the ability to succumb to predetermined force loads so that the fastener can destruct, thereby permitting the panel to become free.

It is particularly useful in the automotive industry to have members which can become disassociated and/or detached from other members upon the impact such as a crash. For example, where snow and ice are prevalent, often, noise panels, which are installed underneath the carriage of an automobile, can become jarred by their contact with snow and/or ice or other objects. Instead of having the panel damaged or ripped, it is more desirable that the panel fastening members, such as a fastening stud, release and then permit the panel to become detached as a whole rather than as a fragmented collection of pieces. This promotes reuse of the panel and minimizes further damage to the surfaces involved. Furthermore, it is useful if the receptacle can be reused, if it itself is not damaged.

Furthermore, often noise panels are attached to other members, such as the bumper of a car, headlamps, fog lamps, grilles and other vehicle components, which are costly to replace, in the event that they would come off with the panel. Therefore, it is preferable to provide a means for fastening such a panel to a vehicle which will release itself from the vehicle, and the other vehicle components to which it is attached, while minimizing damage to further parts of the vehicle.

SUMMARY OF THE INVENTION

The present invention provides a fastening device comprising a receptacle and a stud fastening member for use in connection therewith. The fastening device of the present invention is designed for high intermittent loads and has predetermined forced specifications for maintaining a static load and has a threshold peak working load. For example, the fastening device may operate under a steady state load of 50 Newtons (N) and may have a peak working load of 800 N. The fastening device preferably includes a receptacle and a stud. After exceeding the peak working load, the stud will shear, and therefore permit release of the panel or member which it is attaching.

Preferably, the stud is made of a plastic and is composed to provide shearing at the desired operative peak or threshold load force. The plastic preferably, is a corrosion-resistant material which improves the durability of the fastening members.

A clip-on type receptacle is preferably provided for use with the fastening stud member. Preferably, a wave-shaped configuration provides an interaction zone with a maximum load bearing area between the stud and receptacle surfaces. Preferably, the stud is configured with enlarged radial end portions to facilitate distribution of force loads so that stress concentrations at the lugs of the stud can be reduced. The receptacle and stud, together, cooperate to provide a predetermined breakpoint for predictable shear failure at predetermined operating/stress loads.

The stud preferably has an enlarged end configuration with a wave shaped interaction zone. The receptacle is provided with a compatibly associated wave-shaped interaction zone to permit retention of the stud when the stud is turned, such as, a quarter-turn, to fasten the stud with the receptacle. Preferably, the receptacle is a clip-on type and can be clipped to the edge of a panel or frame.

DETAILED DESCRIPTION OF THE PREFERRED EMBODIMENTS

Figure 1:
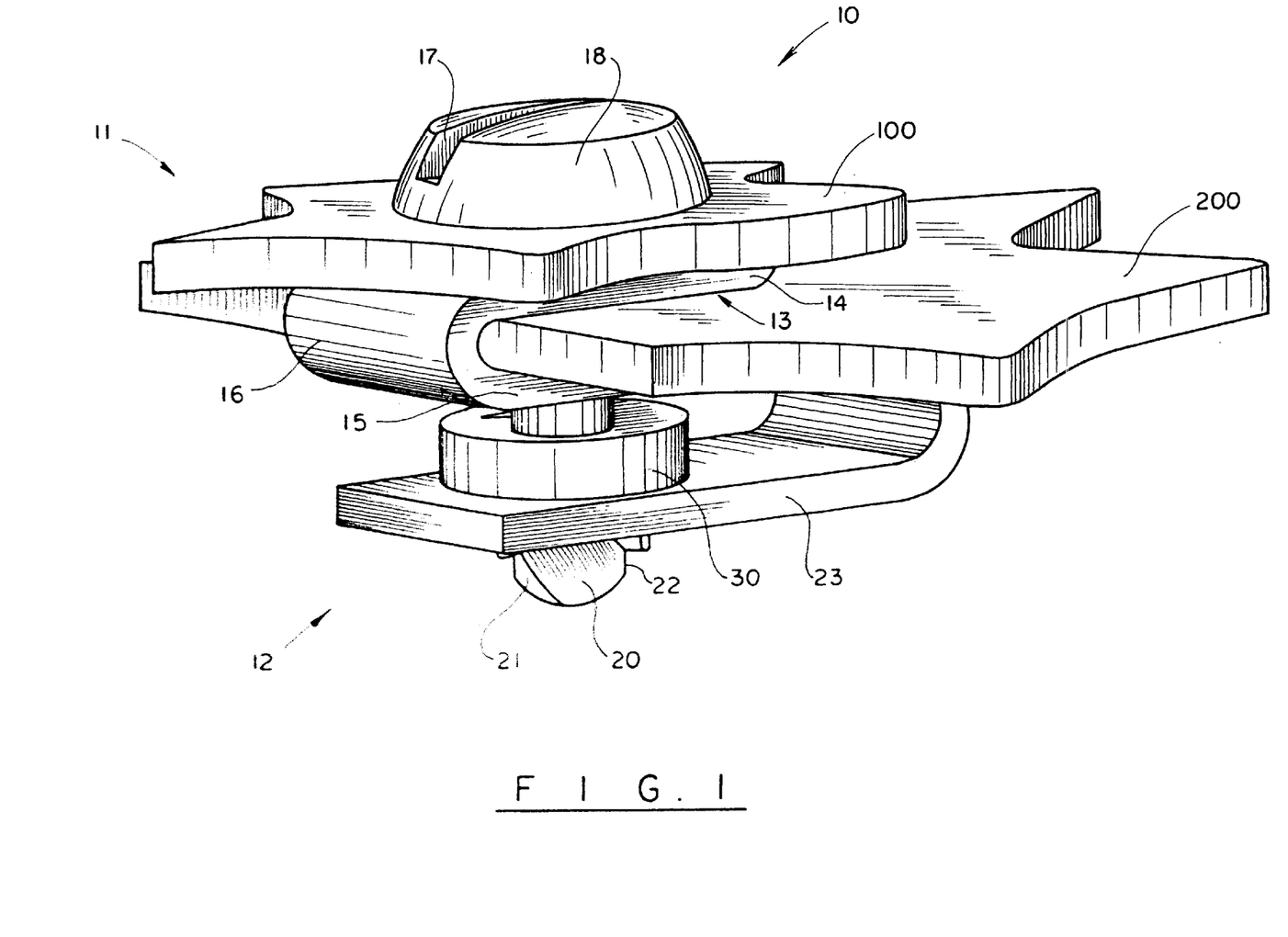
FIG. 1 is a perspective view of the fastening device according to a first embodiment of the present invention.
Figure 2:
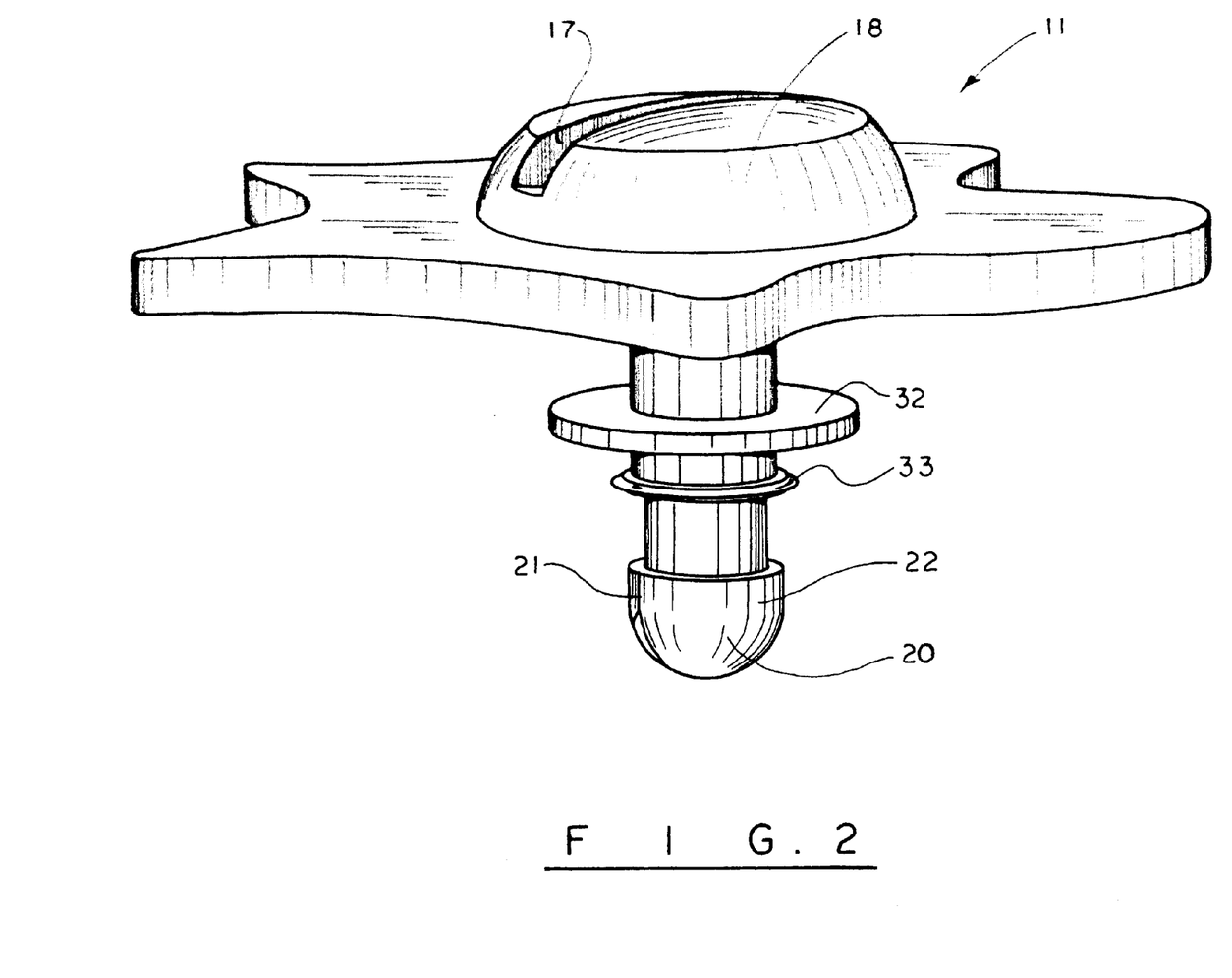
FIG. 2 is a perspective view of the stud according to a first embodiment of the present invention.
Figure 3:
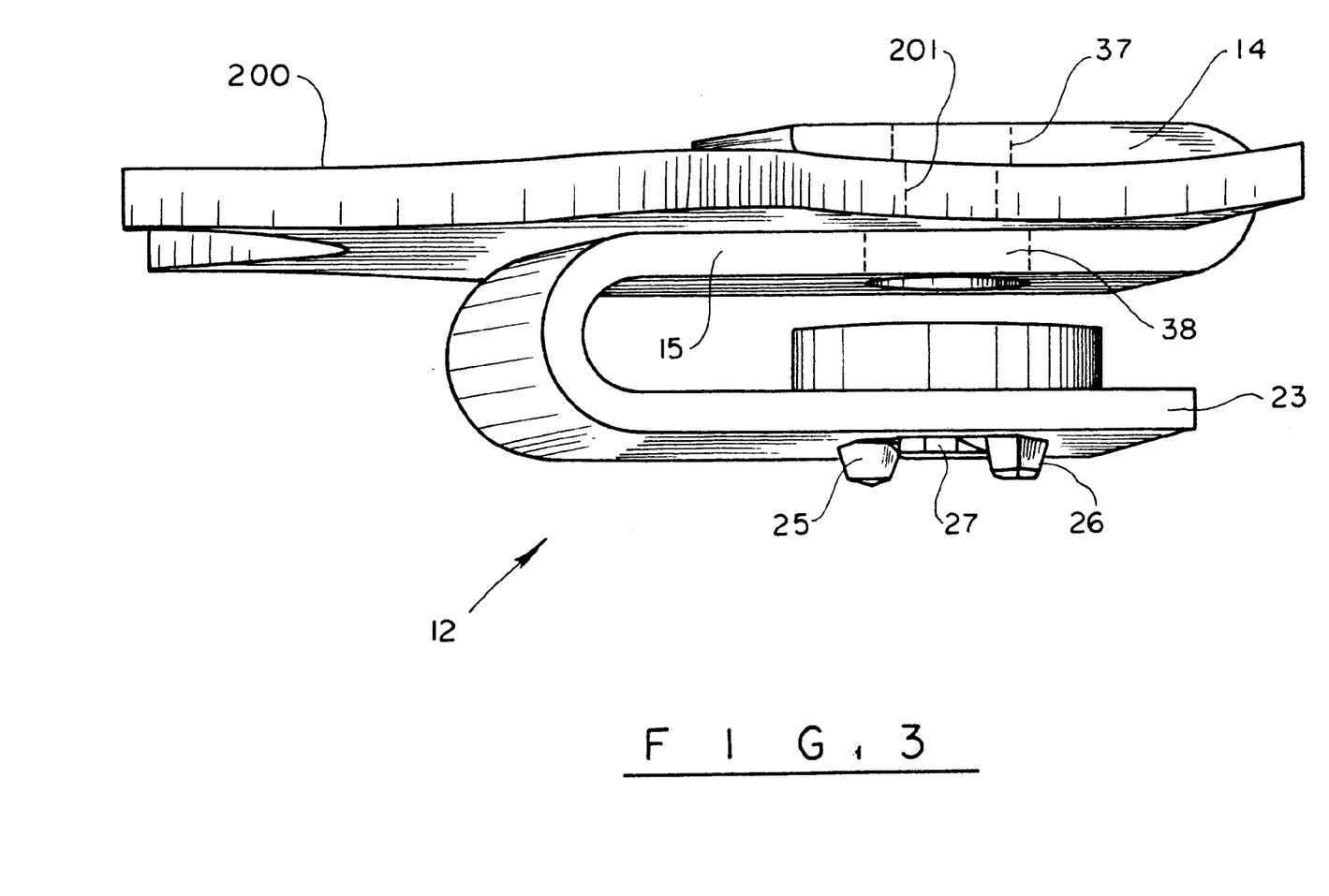
FIG. 3 is a perspective view of the receptacle according to a first embodiment of the present invention.

Referring to FIGS. 1–3, a first alternate embodiment of a fastening device 10 according to the present invention is shown comprising a stud 11 for use in securing a first member, such as a panel 100 to a corresponding panel or frame 200. A receptacle 12 is provided and is shown comprising a generally s-shaped configuration with means for attaching the receptacle 12 to a frame 200. The means for attaching the receptacle 12 to the frame 200 includes a clip 13 formed as part of the generally s-shaped receptacle configuration and having an upper clip arm 14 and a lower clip arm 15 connected by a radiused portion 16. Preferably, the upper clip arm 14 and lower clip arm 15 are deflectable so that they can be deflected by the frame 200 when the receptacle 12 is installed thereon. For example, the upper clip arm 14 and lower clip arm 15 with the connecting radiused portion 16 can function like a leaf spring. This can also provide a preload force for the stud 11. In addition, while not shown, the underside of the upper arm 14 and/or top side of the lower arm 15 may contain barbs or other elements which facilitate attachment and/or holding of the receptacle 12 onto the frame 200.

The stud 11 is shown with a head 16 having a slot 17 therein. The slot 17 is provided to facilitate turning the stud 11 with a tool, such as, for example a slotted screwdriver. It is conceivable that other configurations for use with other tools, including Phillips head screwdrivers, specially configured tools, can also be utilized as an alternate to the slot 17 shown and described herein. The stud 11 is shown in FIG.

2 having an end 20 with lugs 21, 22 thereon for retention of the stud 11 in the receptacle 12. Specifically, the end 20 of the stud 11 is shown in FIG. 1 extending below the base 23 of the receptacle 12. On the underside of the base 23 are projections 25, 26 disposed on the edge of the receptacle bore 27. The fastening stud 11 is configured to be inserted into the bore 27 of the receptacle 12 and rotated one-quarter turn to close. Similarly the stud 11 can be released by a counter-rotation of one-quarter turn.

The receptacle further has a collar 30 extending upwardly from the base 23 for facilitating retention and alignment of the stud 11. Referring to FIG. 2, the stud 11 is shown having an upper surrounding flange 32 and lower surrounding flange 33. Preferably, the upper surrounding flange 32 and lower surrounding flange 33 can facilitate the maintenance of the stud 11 on a panel so that the stud 11 will not become detached from the panel 100 when not connected with the receptacle 12.

FIG. 3 shows a separate view of the receptacle 12 installed on a panel 200. The receptacle preferably has an aperture 37 disposed in the upper arm 14 and an aperture 38 disposed in the lower arm portion 15. Preferably, the panel 200 also has an aperture 201 which is provided to align with the apertures 37, 38 of the receptacle 12 so that the stud 11 can pass therethrough for connection of the stud end 20 with the receptacle bore 27.

Preferably, the stud end 20 will have a wave-shaped configuration, and the retaining bore 27 will be provided with a matingly associated wave-shaped configuration. The wave-shaped configuration provides an increased load-bearing area to provide increased distribution of the force load.

Figure 4:
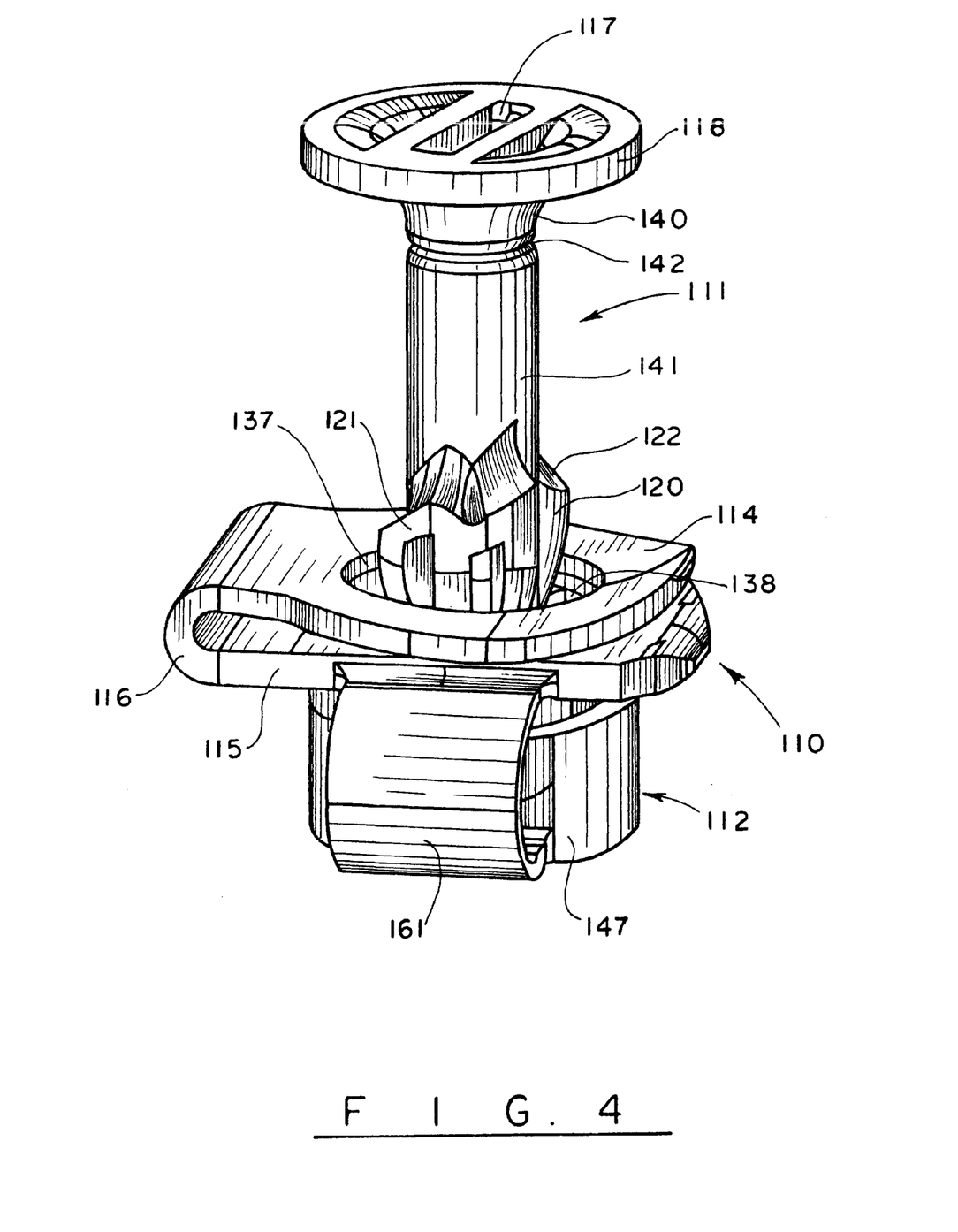
FIG. 4 is a perspective view of the fastening device according to a second embodiment of the present invention.

A second alternate embodiment of a fastening device 110 is shown in FIG. 4 comprising a stud 111 and receptacle 112. The stud 111 has a head 116 with a slot 117 therein, which, although shown as a slot 117 can comprise alternate configurations as described above in connection with the stud 11 of the first alternate embodiment. The stud 111 includes a neck 140 and a shaft 141 which join at a collar 142. Preferably, for example, the collar 142 can comprise the designated shearing location. Alternately, the neck 140 can be joined with the shaft 141 without the collar 142 where a shearing portion is not called for.

Figure 5:
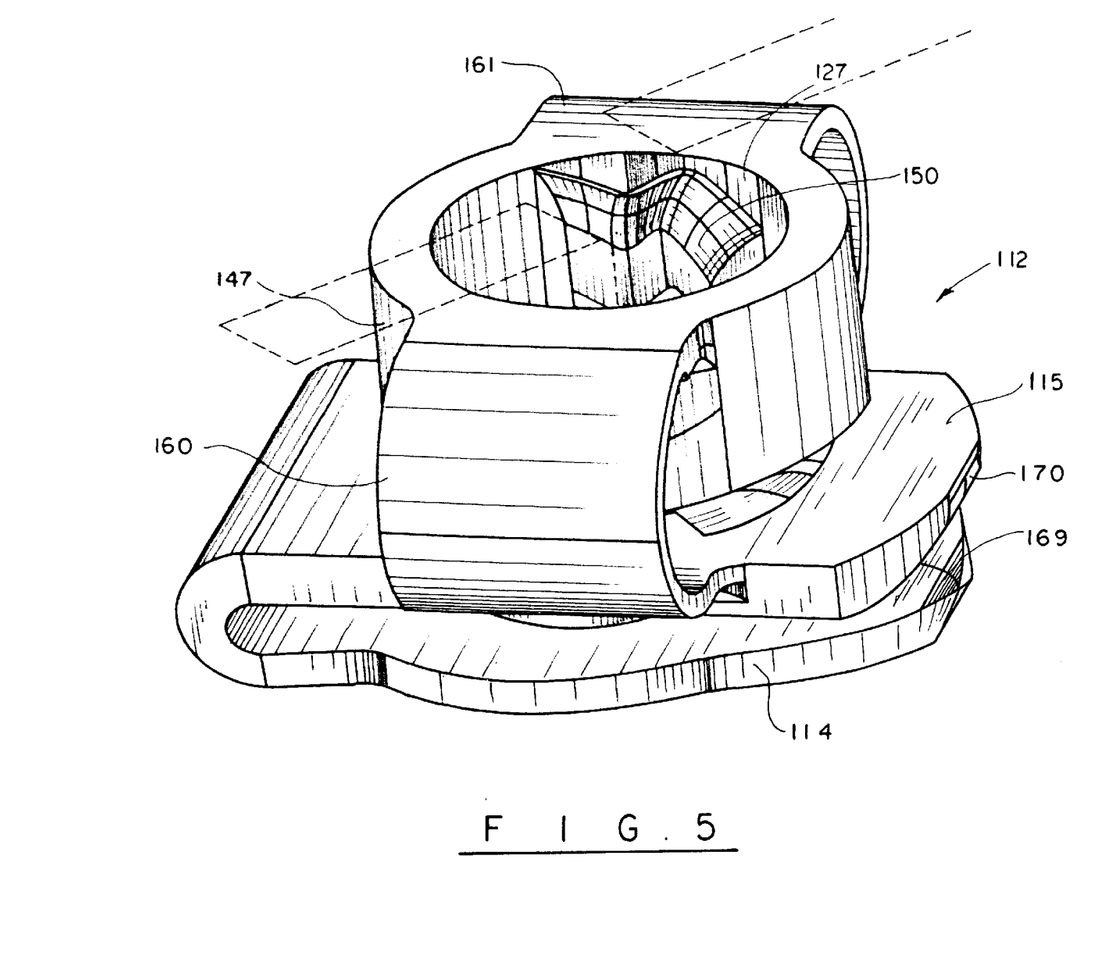
FIG. 5 is a perspective view of the receptacle according to a second embodiment of the present invention.

The receptacle 112 is shown best in FIG. 5 having a bore 127 for receiving the end 120 of the stud 111 therein. The bore 127 of the receptacle 112 is shown provided with a wave-like configured wall portion 150 forming the interior surface of the bore 127. Preferably, the stud 111 is provided with a matingly associated wave configuration at the stud end 120. The stud end 120 is provided with lugs 121, 122 extending outwardly from the shaft 141.

Figure 6:
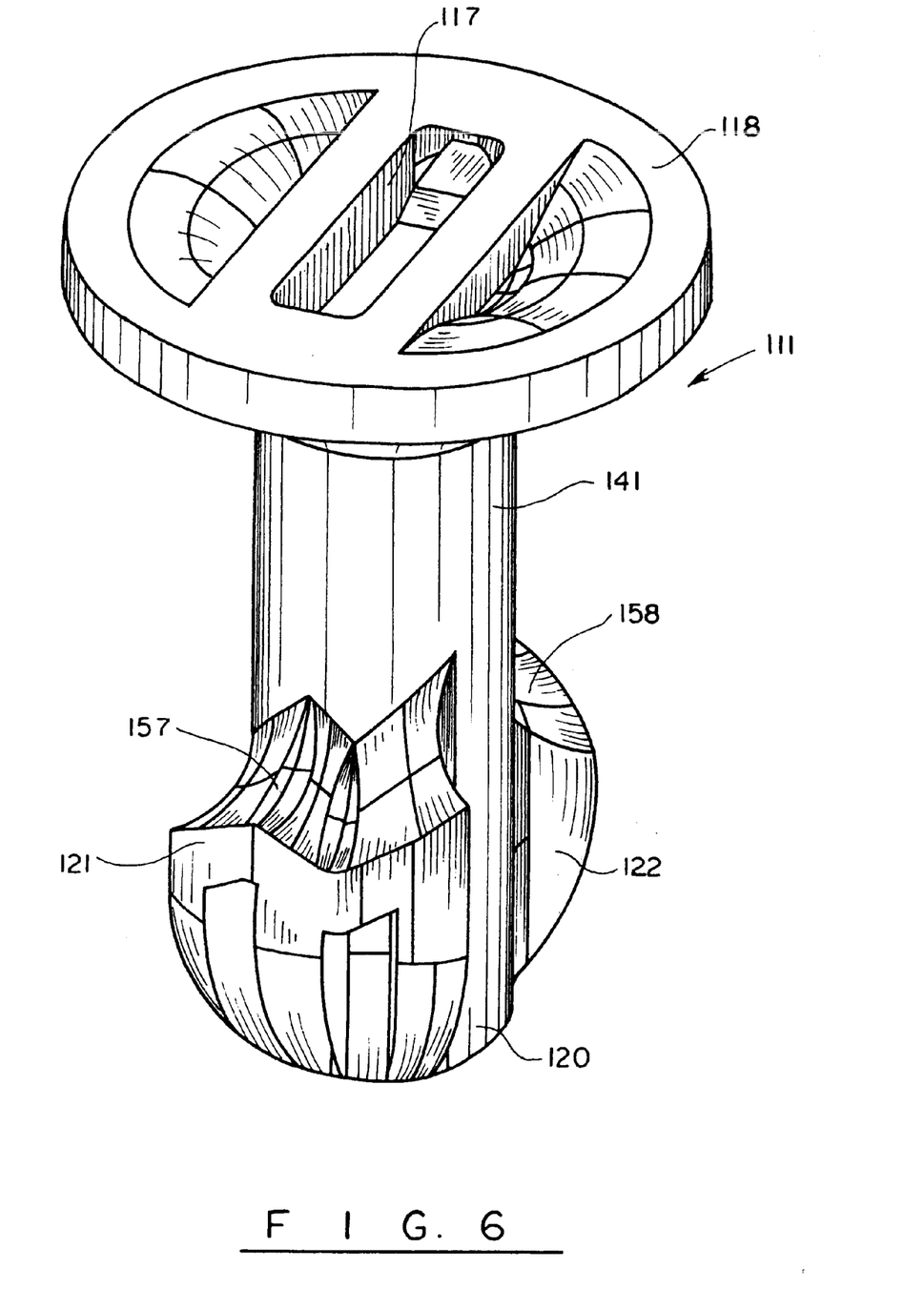
FIG. 6 is a perspective view of the stud according to a second embodiment of the present invention.

Referring to FIG. 6, the stud 111 is shown in detail, showing the lugs 121, 122, each being provided with a wave-like configuration. The lugs 121, 122 provide a wide area over which to contact the receptacle 112. While not shown, the stud 111 can also be provided with a retainer which facilitates retaining the stud on a panel, such as that 100, so that the stud does not detach from the panel when not installed in the receptacle.

The receptacle 112 is provided with an upper clip arm 114 and a lower clip arm 115 connected by a radiused connecting portion 116. A first aperture 137 is provided in the upper clip arm 114, and a second aperture 138 is disposed in the lower dip arm 115. A receiving collar 147 is provided on the receptacle 112 to facilitate connection with the stud end 120 when it is inserted therein and turned one-quarter turn. The wave-like configuration of the inner wall of the collar wall 150 facilitates the fastening of the stud 111.

A pair of wings 160, 161 are disposed between the lower clip arm 115 and the collar 147. The wings 160, 161 for example, can provide further support for the receptacle 112 when the stud end 120 is fastened. The wings can also provide a spring arrangement for providing a preload force for the fastened stud.

The wave configuration of the stud end 120 and lugs 121, 122 is provided to align with the receptacle inner wall 150 in a locking position upon a quarter turn after insertion of the stud end 120 into the receptacle bore 138.

The invention provides an improved fastening device with improved contact area between the stud and receptacle with minimal stress concentration. Furthermore, the lug radii 157, 158, which join the lugs 121, 122, respectively with the shaft 141, are increased to reduce the stress concentrations at those locations. In addition, the receptacle clip arms 114, 115 can be provided with a radiused leading edge portion 169, 170, respectively for facilitating attachment of the receptacle on a panel member, such as that 200.

The shear design enables the fastening device to fail in a predictable way so that the integrity of the articles fastened by the device is preserved. The receptacles 12 and 112, preferably provide leaf spring arrangements thereby providing a preload force for the fastened stud.

As is readily apparent from FIGS. 4–6, the hugs 121, 122 are provided with wave-shaped interaction zones 157. Each interaction zone 157 has a wave-shape defined by a crest and a trough, with said interaction zone falling off on either side of said crest and rising on either side of said trough. Each interaction zone 157 continuously transitions from said crest to said trough. Accordingly, each interaction zone 157 can be thought of as following a sinusoidal or sigmoid profile. The wave-like configured wall portions 150 of the interior surface of the bore 127 are complementary to the interaction zones 157 and have crests and troughs that mate with the troughs and crests of the interaction zones 157, respectively. Accordingly, each wave-like configured wall portions 150 can also be thought of as following a sinusoidal or sigmoid profile.

It is to be understood that the invention is not limited to the preferred embodiments described herein, but encompasses all embodiments within the scope of the following claims.

We claim:

1. A fastening device for securing a first member to a second member, the fastening device comprising:
    a stud having a head and an end having at least one lug projecting therefrom, said at least one lug having an interaction zone having a wave-shape defined by a sigmoid profile having a crest and a trough with said interaction zone falling off on either side of said crest and rising on either side of said trough; and
    a base having a surface engageable by said at least one lug to thereby releasably fasten said stud to said base such that the fastening device can be used to secure the first member to the second member when said stud is fastened to said base.

2. The fastening device according to claim 1, wherein said base has a bore adapted for receiving said end of said stud, said bore has an interior surface, said interior surface has a wave-like configured wall portion, said surface engageable by said at least one lug is formed by said wave-like configured wall portion of said interior surface of said bore of said base, said wave-shaped interaction zone of said at least one lug mates with said wave-like configured wall portion of said base when said stud is fastened to said base in order to secure the first member to the second member.

3. The fastening device according to claim 2, wherein said stud has a shearing portion intermediate said head and said end having said at least one lug, whereby said stud will shear allowing the fastening device to destruct when the fastening device is operated under a working load that exceeds a predetermined threshold peak working load.

4. The fastening device according to claim 3, wherein said predetermined threshold peak working load is about 800 N.

5. The fastening device according to claim 3, wherein said stud is turned a quarter turn to fasten said stud with said base.

6. The fastening device according to claim 5, wherein said base is part of a receptacle that is of a clip-on type.

7. The fastening device according to claim 6, wherein the second member has an aperture therethrough, and said receptacle further includes an upper clip arm, a lower clip arm, and a radiused portion connecting said upper clip arm and said lower clip arm, said upper clip arm and said lower clip arm each having and aperture in alignment with one another, said upper clip arm and said lower clip arm being capable of receiving the second member therebetween such that said aperture in each of said upper clip arm and said lower clip arm will align with the aperture through the second member to thereby allow said stud to pass through said upper clip arm and said lower clip arm and for said end of said stud having said at least one lug to be fastened to said bore of said base when the fastening device is used to secure the first member to the second member.

8. The fastening device according to claim 7, wherein said receptacle further includes a spring arrangement disposed between said lower clip arm and said base such that a preload force is applied to said stud when said stud is fastened to said base and the fastening device is being used to secure the first member to the second member.

9. The fastening device according to claim 8, wherein said spring arrangement is a leaf spring arrangement disposed between said lower clip arm and said base.

10. A fastening device according to claim 1, wherein said stud is provided with at least one flange to maintain said stud on said first member when said stud is not connected with said receptacle.

11. A fastening device for securing a first member to a second member, the fastening device comprising:

a stud having a head and an end having at least one lug projecting therefrom, said at least one lug having an interaction zone having a wave-shape defined by a crest and a trough with said interaction zone falling off on either side of said crest and rising on either side of said trough; and a base having a surface engageable by said at least one lug to thereby releasably fasten said stud to said base such that the fastening device can be used to secure the first member to the second member when said stud is fastened to said base, wherein said base has a bore adapted for receiving said end of said stud, said bore has an interior surface, said interior surface has a wave-like configured wall portion, said surface engageable by said at least one lug is formed by said wave-like configured wall portion of said interior surface of said bore of said base, said wave-shaped interaction zone of said at least one lug being the same wave-shape as said wave-like configured wall portion of said base, said wave-shaped interaction zone of said at least one lug mates with said wave-like configured wall portion of said base when said stud is fastened to said base in order to secure the first member to the second member.

12. The fastening device according to claim 11, wherein said stud has a shearing portion intermediate said head and said end having said at least one lug, whereby said stud will shear allowing the fastening device to destruct when the fastening device is operated under a working load that exceeds a predetermined threshold peak working load.

13. The fastening device according to claim 12, wherein said predetermined threshold peak working load is about 800 N.

14. The fastening device according to claim 12, wherein said stud is turned a quarter turn to fasten said stud with said base.

15. The fastening device according to claim 14, wherein said base is part of a receptacle that is of a clip-on type.

16. The fastening device according to claim 15, wherein the second member has an aperture therethrough, and said receptacle further includes an upper clip arm, a lower clip arm, and a radiused portion connecting said upper clip arm and said lower clip arm, said upper clip arm and said lower clip arm each having and aperture in alignment with one another, said upper clip arm and said lower clip arm being capable of receiving the second member therebetween such that said aperture in each of said upper clip arm and said lower clip arm will align with the aperture through the second member to thereby allow said stud to pass through said upper clip arm and said lower clip arm and for said end of said stud having said at least one lug to be fastened to said bore of said base when the fastening device is used to secure the first member to the second member.

17. The fastening device according to claim 16, wherein said receptacle further includes a spring arrangement disposed between said lower clip arm and said base such that a preload force is applied to said stud when said stud is fastened to said base and the fastening device is being used to secure the first member to the second member.

18. The fastening device according to claim 17, wherein said spring arrangement is a leaf spring arrangement disposed between said lower clip arm and said base.

19. A fastening device according to claim 11, wherein said stud is provided with at least one flange to maintain said stud on said first member when said stud is not connected with said receptacle.

* * * * *

UNITED STATES PATENT AND TRADEMARK OFFICE
CERTIFICATE OF CORRECTION

PATENT NO. : 6,688,831 B2
DATED : February 10, 2004
INVENTOR(S) : Jeffrey L. Antonucci et al.

It is certified that error appears in the above-identified patent and that said Letters Patent is hereby corrected as shown below:

Column 4,
Line 27, replace "hugs" with -- lugs --.

Signed and Sealed this

Twentieth Day of July, 2004

JON W. DUDAS
*Acting Director of the United States Patent and Trademark Office*